US 6,678,209 B1

(12) United States Patent
Peng et al.

(10) Patent No.: US 6,678,209 B1
(45) Date of Patent: Jan. 13, 2004

(54) APPARATUS AND METHOD FOR DETECTING SONAR SIGNALS IN A NOISY ENVIRONMENT

(76) Inventors: Luc Peng, 2000 S. Federal Hwy., Boynton Beach, FL (US) 33435; Danny Peng, 1629 Riverview Rd., Deerfield Beach, FL (US) 33441

( * ) Notice: Subject to any disclaimer, the term of this patent is extended or adjusted under 35 U.S.C. 154(b) by 0 days.

(21) Appl. No.: 10/083,183

(22) Filed: Feb. 26, 2002

Related U.S. Application Data

(60) Provisional application No. 60/334,039, filed on Nov. 21, 2001.

(51) Int. Cl.[7] ............................................... G01S 15/12
(52) U.S. Cl. ....................................................... 367/95
(58) Field of Search ........................... 367/95, 101, 901, 367/92

(56) References Cited

U.S. PATENT DOCUMENTS

| | | | |
|---|---|---|---|
| 4,916,675 A | | 4/1990 | Hoering |
| 5,277,065 A | | 1/1994 | Leszczynski |
| 5,305,286 A | * | 4/1994 | Woodsum et al. ............ 367/92 |
| 5,367,497 A | | 11/1994 | Marschall |
| 5,375,101 A | | 12/1994 | Wolfe et al. |
| 5,515,342 A | | 5/1996 | Stearns et al. |
| 5,895,855 A | | 4/1999 | Ishikawa et al. |
| 6,052,335 A | | 4/2000 | Korolenko |
| 6,122,222 A | | 9/2000 | Hossack et al. |
| 6,236,862 B1 | | 5/2001 | Erten et al. |

FOREIGN PATENT DOCUMENTS

EP            0969292 A2 *  1/2000  ........... G01S/15/32

* cited by examiner

Primary Examiner—Daniel T. Pihulic
(74) Attorney, Agent, or Firm—John C. Smith

(57) ABSTRACT

A method and apparatus for reducing sonar measurement error in noisy environment, by monitoring environmental noise spectrum over the range of operable sonar frequencies, and automatically changing the system sonar transmission frequency and its dependent components in order to avoid the detected interference frequencies. A wide band transceiver and a digital signal processor (DSP) can be used as a Frequency Server, and to monitor the environmental noise spectrum continuously through the use of Fast Fourier Transform (FFT) algorithm to produce noise frequency database for the Frequency Server. Each transmission cycle, the DSP dynamically getting frequency from the Frequency Server were noise is below a certain level for sonar transmission and adjust its dependent components accordingly. Thus, continuously maintains reliable measurements even in the presence of sporadic interference.

20 Claims, 6 Drawing Sheets

APPARATUS AND METHOD FOR DETECTING SONAR SIGNALS IN A NOISY ENVIRONMENT

CROSS-REFERENCE TO RELATED APPLICATIONS

This application is related to, and claims the benefit of, the commonly owned copending provisional patent application entitled "Apparatus and Method for Detecting Sonar Signals in a Noisy Envirounment," filed Nov. 21, 2001, bearing U.S. Ser. No. 60/334,039 and naming Luc Peng and Daniel Peng, the named inventors herein, as inventors, the contents of which is specifically incorporated by reference herein in its entirety.

BACKGROUND OF THE INVENTION

1. Technical Field

The present invention relates to sonar systems. In particular, it relates to the sonar systems that determine sonar transmission frequency according to the ambient noise spectrum.

2. Background

Sonar technology originated as a tool for use in marine operations. Its original applications were particularly valuable to the military to improve the ability of naval forces to detect other ships, tend to determine their position and direction. Overtime, this technology has found numerous useful applications. For example, it can be used to measure the contents of closed liquid containers, such as fuel storage tanks, etc. Likewise, this technology found substantial use in the medical arts. Physicians seeking to monitor the condition of pregnant women routinely use ultrasound technology, which is based on sonar technology, to generate fetal images without endangering the fetus. In each of these applications, the quality of the reflected signal, and the subsequent value of the data produced therefrom, are often adversely affected by ambient background noise.

When used in a marine environment, the sonar system is bombarded by ambient noise from a variety of sources. For example, the ship transmitting the sonar signal produces noise across a wide frequency range. There may be other ships or structures in the nearby water that are also generate noise across a wide frequency range. Due to the interaction of natural underwater structures and the natural movement of water, a substantial amount of ambient noise may also be produced. As a result, underwater sonar systems operate in an environment that has high levels of ambient noise that is generated from a variety of sources, and is spread across a wide frequency range. It would be desirable to have a method of minimizing the effect of ambient noise on sonar systems used for underwater applications.

The prior art has made attempts to address this issue. One method has been to use a cable to tow one or more hydrophones behind a ship. The separation of the hydrophones from the ship reduces the vibrations that would otherwise be directly transmitted to the hydrophones by mechanical attachment to the ship. Likewise, the hydrophones can be shaped to minimize turbulence and thereby reduce noise from its own movement through the water. However, this type of device is fixed in terms of its transmission/reception frequency and is therefore susceptible to variations in ambient noise levels at those frequencies.

Another approach has been to use a single transmitter in combination with multiple hydrophone sensors. By tuning individual hydrophone sensors to either the transmission frequency or harmonics thereof, the system can selectively use the different frequency data to obtain improved directional information. This system is also fixed in terms of its transmission frequency. The various hydrophone sensors are also fixed to a particular frequency and are therefore susceptible to variations in ambient noise levels at those frequencies.

Yet another approach has been to use a dual transmitter system in which a low frequency transmitter and corresponding hydrophone sensor is used for extended range and a high frequency transmitter and corresponding hydrophone sensor is used for short-range precision. As was the case in the prior art systems discussed above, this system also uses a fixed frequency system that is susceptible to variations in ambient noise levels at those frequencies.

None of the prior art systems address the problem created by the dynamic nature of the marine environment. In particular, the sensitivity problem created by the constant changes in ambient noise levels at any given frequency is not addressed by any of the foregoing systems. It would be desirable to have a method of reducing sensitivity problems caused by ambient noise level changes at particular frequencies.

Another technological area in which sonar technology has been found useful has been the development of sonar-based measurement devices. In particular, sonar devices are often used as measuring devices to examine the level of the contents of fluid containers, and/or the rate of fluid flow within conduits. As was the case above in regard to marine systems, ambient noise will vary greatly from one location to another, and further, will vary greatly in a single location over the course of time. As a result, fixed frequency devices will have varying performance results depending on the ambient noise existing at the time of measurement.

In the medical arts, the use of sonar technology in conjunction with ultrasound equipment has provided medical professionals with the ability to perform noninvasive examination procedures for variety of medical conditions. As was the case above, conventional ultrasound equipment does not provide the ability to avoid noise problems through the use of dynamic frequency selection methods.

Sonar system designs have difficulty detecting small sonar echoes because they do not contain enough attributes to distinguish them from other sounds, such as ambient noise. All the sonar echo has is amplitude and frequency. Likewise, ambient noise can be easily mistaken for a sonar echo when it is composed of a similar frequency and has sufficient amplitude. Hence, it is important that the sonar echo have the largest possible amplitude in relation to noise with similar frequency in order to facilitate its detection. It would be desirable to have a sonar-based system capable of selecting the lowest possible ambient noise level for a selected frequency in order to maximize the signal to noise ratio of the received sonar signal.

While the sonar technology has been used for a variety of applications, the prior art has failed to provide a method of monitoring ambient noise for the purpose of dynamically varying the sonar signal frequency to match ambient noises with low noise amplitude levels in order to maintain a high signal to noise ratio.

SUMMARY OF THE INVENTION

The present invention solves the foregoing problems by providing a sonar system which improves performance in noisy environments by dynamically selecting a sonar transmission frequency which matches a low ambient noise frequency such that a high signal to noise level is obtained. The system automatically scans the ambient noise across the frequency band used for sonar transmission, selects a frequency with a low ambient noise level and dynamically changes the transmitted sonar frequency to the frequency, thereby creating an improved signal to noise ratio. A preferred method of implementing the invention is to use a sensor and an FFT spectrum analyzer to monitor the environment. The FFT spectrum analyzer may be programmable or hardwired. The FFT spectrum analyzer selects a sonar transmission frequency by determining the ambient noise frequency with a low amplitude based on specified criteria. The sonar transmission system, and its components such as receiver filters, converters, discriminators, etc., has a wide operable sonar frequency range so that the transmission frequency can be dynamically altered based on the selected sonar transmission frequency. The selection of a transmission frequency can be made every transmission cycle, or only predetermined timed basis. An alternative embodiment provides the option of dynamically varying transmission amplitude as well based on the detected ambient noise levels, for the purpose of prolonging the life of the sonar sensor or minimizing sonar-radiated emissions. Another alternative embodiment provides for avoidance of self-interference by switching to an alternative frequency each transmission cycle instead of waiting for the echoes to diminish.

DESCRIPTION OF THE PREFERRED EMBODIMENT

Figure 1:
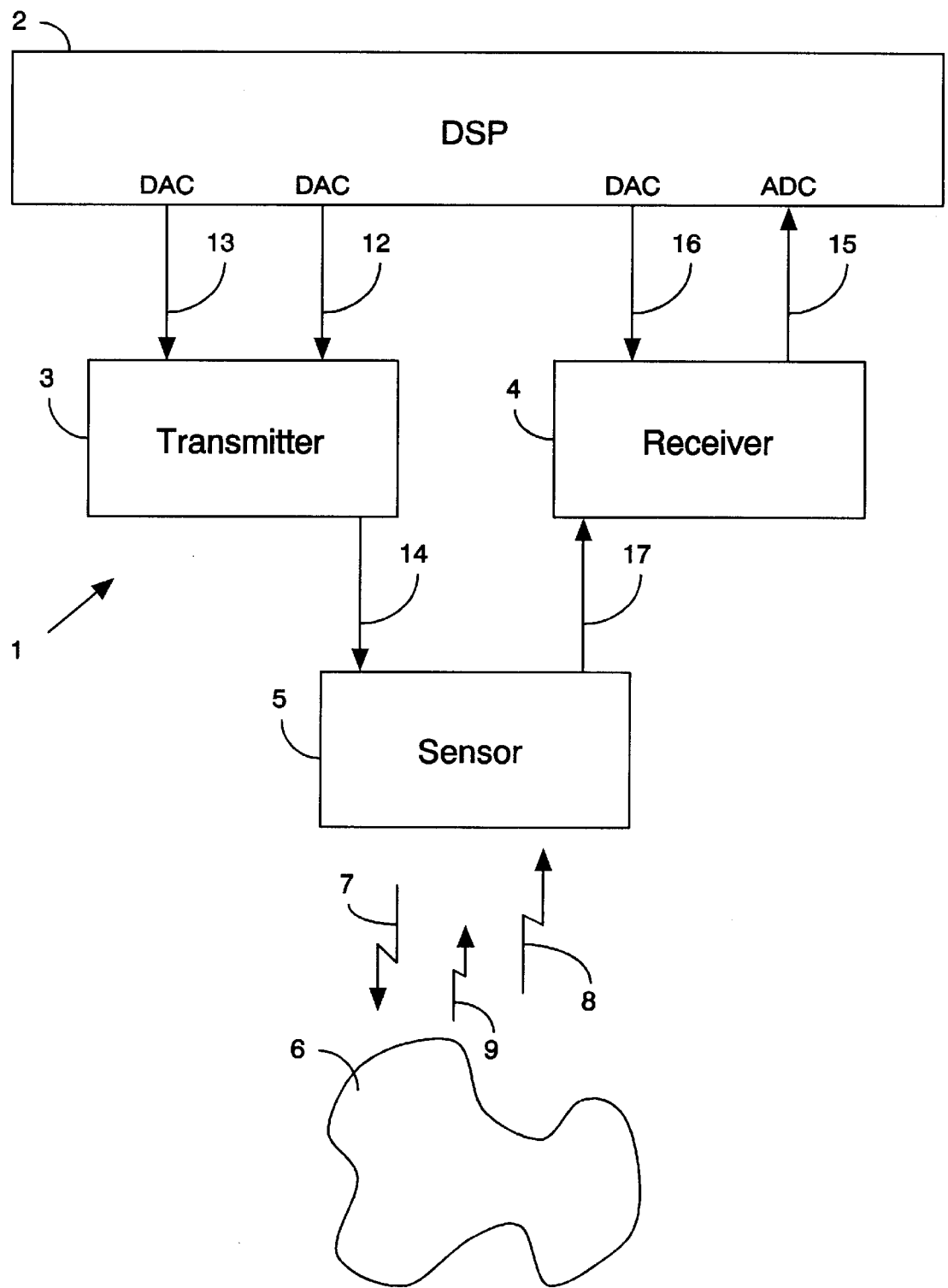
FIG. 1 is a diagram that illustrates a preferred embodiment of the sonar system.

Prior to a detailed discussion of the figures, a general overview of the system will be presented. The system is designed to improve the sonar system performance in the noisy environments by improving the signal to noise ratio of sonar echoes and ambient noise. In a preferred embodiment, the system scans the ambient noise levels across the useful sonar transmission frequency band. It then examines the noise levels of each frequency to determine the best and/or an acceptable ambient noise level. The sonar transmitter frequency is then dynamically set to that frequency. As a result, by modifying the sonar transmission frequency to match a low ambient noise amplitude level, the system automatically provides an improved signal to noise ratio. In a preferred embodiment, the user provides information to the system which determines the selection parameters. For example, the user can input instructions such as: (1) select the frequency where ambient noise is lowest, or (2) select the first frequency where noise is below −80 decibels, or (3) select the next frequency where noise is below −92 decibels, or (4) select the last frequency where noise is below −86 decibels, etc. The system can be programmed to do any or all of the foregoing. Likewise, variations to the instructions can also be made. Once the system has been instructed how to perform, it will dynamically alter the sonar transmission frequency according to the rules input by the user. Of course, rules can be hardwired into the device to eliminate the need for user instructions. Those skilled in the art will recognize that alteration of the sonar transmission frequency over a wide operable sonar frequency range requires that all of the sonar transmitter and receiver components, such as receiver filters, converters, discriminators, transmitters, etc. must be altered as to their selected frequency. Once the frequency has been selected, the sonar system operates in the usual manner: it transmits a sonar signal, collects echoes, manipulates echoes, displays objects, saves data, etc.

In addition to altering transmission frequency, an alternative embodiment provides for dynamic modification of transmitted signal amplitude as well. Assuming that ambient noise level amplitude is low enough to sustain high signal to noise ratios, the transmitted sonar signal amplitude can be reduced and still provide an acceptable signal to noise ratio. This provides an important benefit in that the lower signal levels can help to prolong the life of the sonar sensor and/or minimize sonar-radiated emission.

In addition, another alternative preferred embodiment eliminates the problem of self interference. Self interference is avoided by automatically switching to alternative frequencies even if the current frequency provides an acceptable signal to noise ratio. For example, the next acceptable frequency can be selected instead of waiting for the sonar echoes from previous transmissions to diminish. This avoids a condition where the echo bounces between objects in certain places longer than the desired time. Normally, self-interference is rare, but when it occurs, it can keep the sonar system from operating at the most desired repetition rate.

A complete sonar system may consist of many sub-systems: a keyboard or control panel to configure the system, a sonar transducer to detect an echo acoustic signal, a low noise receiver and filters to receive and amplify the echo acoustical signal, a sonar transmitter to transmit a sonar acoustic wave, a computer to capture, process, format, and store the echo data, and a monitor to display the detected object. This invention provides a new method and apparatus that achieves higher quality sonar echo data in a noisy environment. The system improves upon the prior art by using a Fast Fourier Transform (FFT) algorithm to monitor ambient noise over a range of sonar frequencies, and using the sonar frequency where the detected ambient noise level is below a certain level, or at the lowest level.

Those skilled in the art will recognize that a method of measuring noise levels at various frequencies may be achieved by scanning the noise, frequency by frequency, or using analog filters, digital filter algorithms, Fast Fourier Transform (FFT) algorithms, or directly using a spectrum analyzer.

FIG. 1 is an illustration of a preferred embodiment of the invention. This embodiment is preferred because of its simplicity and practicality for implementing the new method, where the DSP technology and capabilities could be utilized. Although, this embodiment may not be immediately applicable for all sonar industry, nevertheless, as the DSP technology unfolds, where the data processing speed and resolution of measurement increases, its practicality will be realized in time. The disadvantage here is that all of the tasks are executed by firmware; thus, requiring a high speed processor. In this embodiment, the sonar system 1 is controlled by a digital signal processor 2 ("DSP") which in turn controls a sonar transmitter 3. The DSP 2 outputs an analog signal to the transmitter 3 via output signal line 12. Transmitter 3 amplifies signal line 12 and drives the sonar sensor 5 via line 14. Consequently, from the sensor 5, the sonar acoustic wave 7 emits and travels through the transmission medium (e.g., the transmission medium may be water for marine applications, body fluid for ultrasound applications, air distant measurement, etc.) until it strikes an object 6. After transmission, the DSP 2 activates line 13, if applicable, to isolate the transmitter 3 from the sensor 5 in order to avoid sensor noise coupling and sensor signal loading. The object 6 returns a sonar acoustic wave 8 to the sensor 5, which will generate a signal to a receiver 4 via line 17. The receiver 4 amplifies signal line 17 and passes it to the DSP 2 via line 15 under control of receiver gain control lines 16. The DSP 2 then digitizes signal line 15, extracts signals whose frequency is at the transmission frequency, and stores them in its internal memory, usually in chronological order for further processing.

A significant problem illustrated by this figure is the presence of a variety of acoustic noise sources that can interfere with reception of the sonar echo 8. For example, the object 6 which reflects the sonar acoustic wave 7 in the form of a sonar echo 8 may also spontaneously emit object acoustic noise 9 due to its own movement or being stressed by another object. This object noise 9 may be mistaken for sonar echoes 8, and give false readings as to location, motion direction and speed. Likewise, environmental acoustic noise may also be present. Environmental acoustic noise may come from a variety of sources in a particular area, e.g., another system using the same sonar frequency, and may result in the same type of false readings created by object acoustic noise 9.

The invention disclosed herein minimizes the problems created by these ambient noise sources by selecting the sonar frequency which will provide the best signal to noise ratio for the sonar system 1 to capture (this is discussed more fully in regard to FIG. 2, discussed below). In addition, by having the ability to dynamically monitor noise in the available frequency range, and to dynamically control system sonar frequency, the sonar system 1 can automatically adjust itself in response to changes in the environment. As a result, the sonar system 1 continuously provides the best possible signal to noise ratio for a given environment.

Those skilled in the art will recognize that while a DSP 2 is used for purposes of illustration, any suitable controller may be used. For example, a field programmable gate array (FPGA), a microprocessor, a personal computer, a server, a minicomputer, a mainframe, or any other suitable device may be used in place of the DSP 2 so long as it performs the required functions. Furthermore, it is assumed that the DSP 2 is sufficiently fast and contains an internal analog to digital converter with sufficient resolution to meet a required range of measurement. Otherwise, additional receiver filter control components must be added to compensate for a lack of such capabilities.

The DSP 2 using internal FFT algorithm module to continuously monitor the ambient noise over the operable sonar frequency used by the system 1 from the sensor 5 line 17 through receiver 4 line 15. The DSP 2 then would have detected acoustic noise source 9. Prior to transmission of the sonar acoustic wave 7, the DSP 2 extracts the frequency from its FFT module where the noise is the lowest, this would be point 37 in FIG. 2, and synthesizes this signal on line 12. This in turn, transmits acoustic wave 7 from sensor 5. After the transmission, The DSP 2 captures signals though Receiver 4 and extracts those at the sonar transmission frequency with high precision using the internal digital signal processing filter algorithm. Consequently, the extracted echo data visibility is maintained even in the present of unwanted acoustic noise source 9.

Those skilled in art will recognize that the range of frequencies used by the sonar system 1 is not critical and will vary with the nature of the application. For example, marine applications may use lower frequencies because the longer distances involved would benefit from the ability of lower frequency systems to detect objects over longer distances. In other applications, such as medical ultrasound, the measurement distance is not as significant a factor. Therefore, the use of higher frequencies may be more desirable due to their greater precision for measurement purposes. Moreover, to conserve the DSP 2 processing load, the FFT ambient noise monitor could be processed on a periodic basis, at power up or system start, etc. Of course, keeping the FFT process on will ensure the most accurate determination of the frequency with the lowest background noise.

Figure 2:
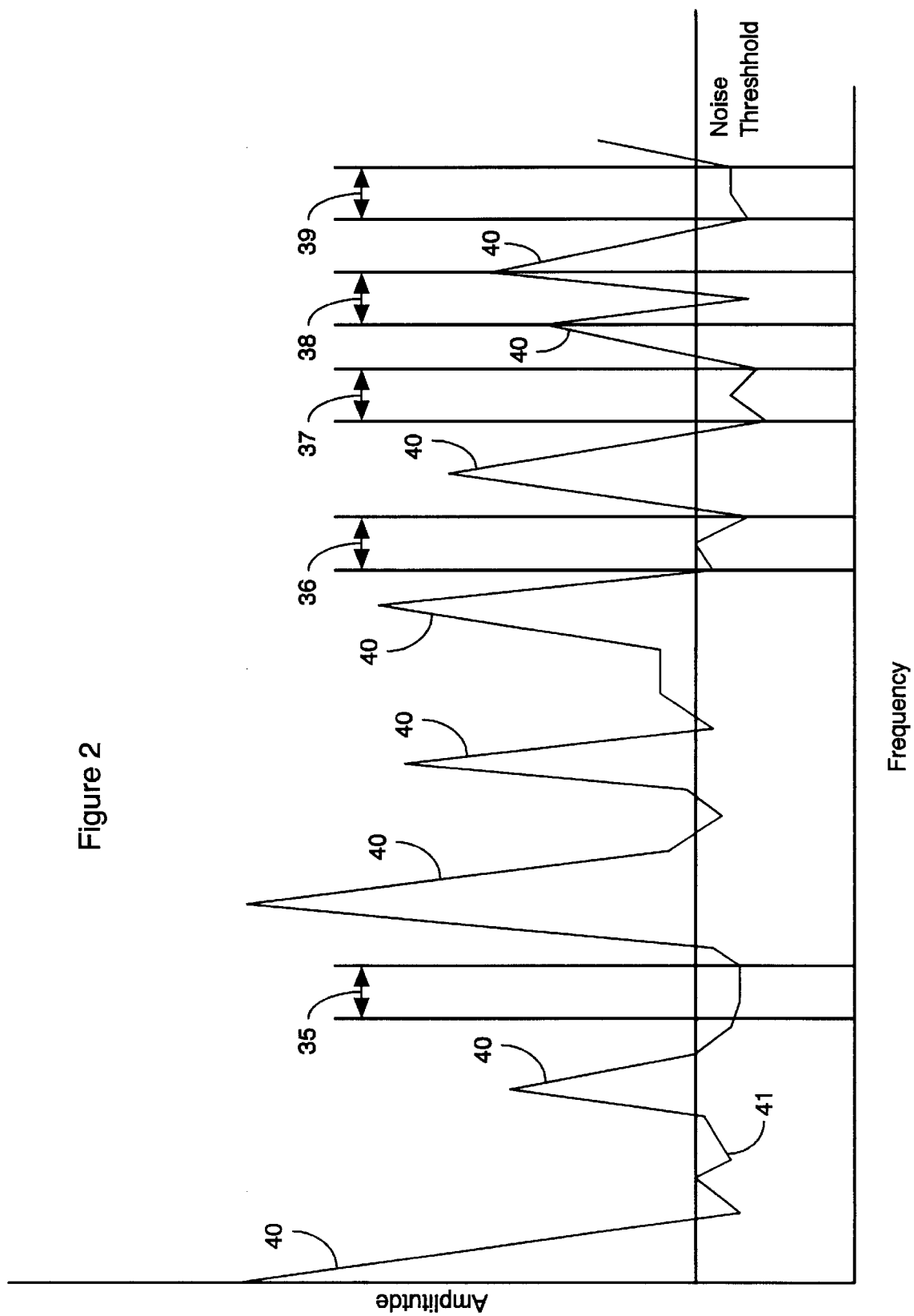
FIG. 2 is a frequency/amplitude plot of ambient noise produced by one or more acoustic noise sources.

FIG. 2 is a frequency/amplitude plot which illustrates surrounding noise detected by a sonar transceiver in the operable sonar frequency. Usually, an acoustic disturbance will create several sporadic spikes 40 across the frequency range illustrated in this figure. For example, when a guitar string is disturbed, more then one acoustic frequency will be emitted. The width of the measurement ranges 35–39 are the same and are based on the bandwidth of the digital filter used to detect the echoes in the sonar system. The middle of the width of each rectangle represented some of the choices of sonar transmission frequencies. In this example, it can be seen that range 37 is the best choice for sonar transmission frequency. Range 39 is slightly higher in that its average noise level throughout its bandwidth is slightly higher than range 37; thus, making range 39 also a good choice. Pragmatically, however, everything depends on system requirements. For example, if the requirement calls for the noise level to be below a certain threshold (for example, the level indicated by the noise threshold), then only a few frequency ranges can be used safely (i.e., ranges 35, 37, and 39).

Those skilled in the art will realize that the width of measurement ranges 35–39 can vary. Likewise, the measurement point for ambient noise amplitude can be the midpoint of the measurement ranges 35–39, as discussed above, or alternatively it can be the averages of each of the measurement ranges 35–39, etc.

Figure 3:
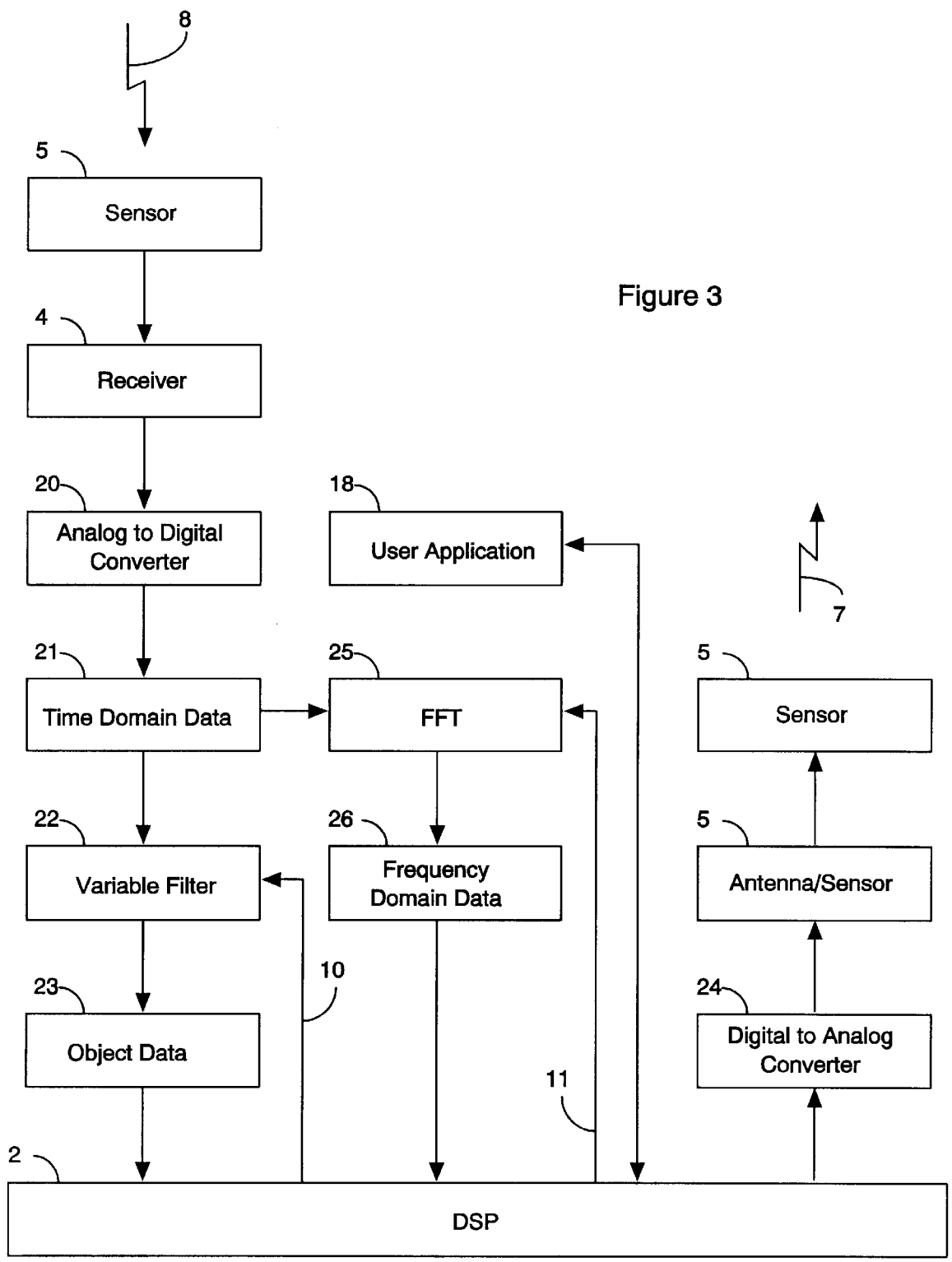
FIG. 3 is a detailed data flow diagram illustrating data flow in a preferred embodiment of the sonar system.

FIG. 3 illustrates a detailed version of the data flow in a preferred embodiment of the invention. In this figure, the sonar echo 8 detected by the sensor 5 along with ambient noise over the operable frequencies are amplified by receiver 4 and input to an analog to digital converter 20 ("ADC"). In the preferred embodiment, the ADC 20 may be internal or external to the DSP 2. The ADC 20 converts analog sensor signals to discrete digital signals and stores them in Time Domain Data Buffer 21.

In the preferred embodiment, the time domain data 21 is stored as a circular buffer. However, those skilled in the art will recognize that any suitable storage means can be used to store the time domain data 21.

The Time Domain Data 21 is used by a Variable Filter process 22, which is a digital filter algorithm, that extracts the echo at the sonar transmission frequency and saves it in Object Data Buffer 23. This frequency is determined by the control bytes on line 10. Line 10 may also contain control bytes to control the Variable Filter 22 bandwidth, in order to capture the echo with shifted frequency; this will allow the system to determine relative motion and velocity of the detected objects 6 using the Doppler Effect principle. The Doppler effect is well known in the art. The DSP 2 could accomplish this by one of the many digital signal processing filter algorithms on data stored in the Object Data Buffer 23.

In the preferred embodiment, the variable filter process 22 is best implemented as a process executed by the DSP 2 for ease of illustration. However, those skilled in the art will recognize that any external device, such as microprocessors, controllers, FPGAs, etc., can also be used so long as they have sufficient processing power.

The time domain data 21 is also used by a Fast Fourier Transform process 25 ("FFT") which converts data in Time Domain Data buffer 21 and store it in Frequency Domain Data buffer 26. Line 11 may contain control bytes used by FFT process 25 to determine the start, stop frequency, and frequency incremental resolution. Please note that the Frequency Domain Data is where all ambient noise frequencies are stored for use.

In the preferred embodiment, the FFT process 25 is best implemented as a process executed by the DSP 2 for ease of illustration. However, those skilled in the art will recognize FFT process 25 may also be implemented by digital filter algorithms, or by reusing the Variable Filter 22. Furthermore, that any external device, such as multiple discrete filters, spectrum analyzers, microprocessors, controllers, FPGAs, etc., can also be used so long as they have sufficient processing power.

The DSP 2 also controls a digital to analog converter 24 ("DAC"). In the preferred embodiment, the DAC 24 may be internal or external. It is used to synthesize the sensor 5 excitation signal to the transmitter 3, which, in turn, amplifies and drives the sensor 5 when it transmits a sonar acoustic wave 7.

Figure 4:
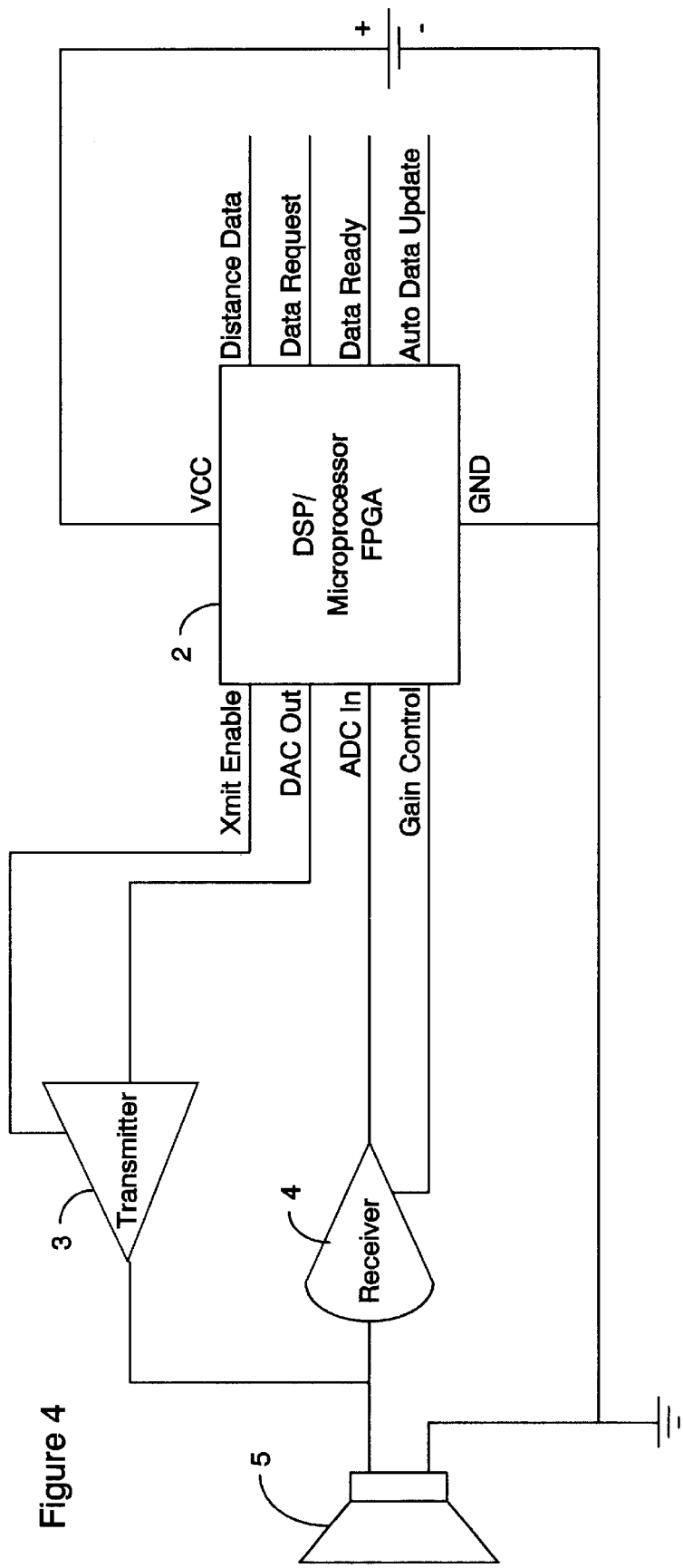
FIG. 4 is a diagram of simplified alternative preferred embodiment that uses a field-programmable gate array (FPGA) to control the sonar system.

FIG. 4 illustrates a desired embodiment that uses a single chip to implement the sonar system 1. This embodiment is functionally equivalent to the embodiment illustrated in FIG. 1. The driver firmware for this system may be derived from the data flow diagram depicted in FIG. 3. In this embodiment, only the main components are shown. Those skilled in art will recognize that more discrete components are necessary in order to conform to certain DSP controller chip manufacture requirements. For example, chip clock crystal, noise decoupling capacitors, diode clamp, etc. The transmitter 3 is simply implemented by a tri-state buffer to drive a low power transceiver 5 and to isolate itself from the receiver 4. The receiver 4 is implemented by a low noise amplifier including gain control, and an appropriate operable frequencies band pass filter.

Figure 5:
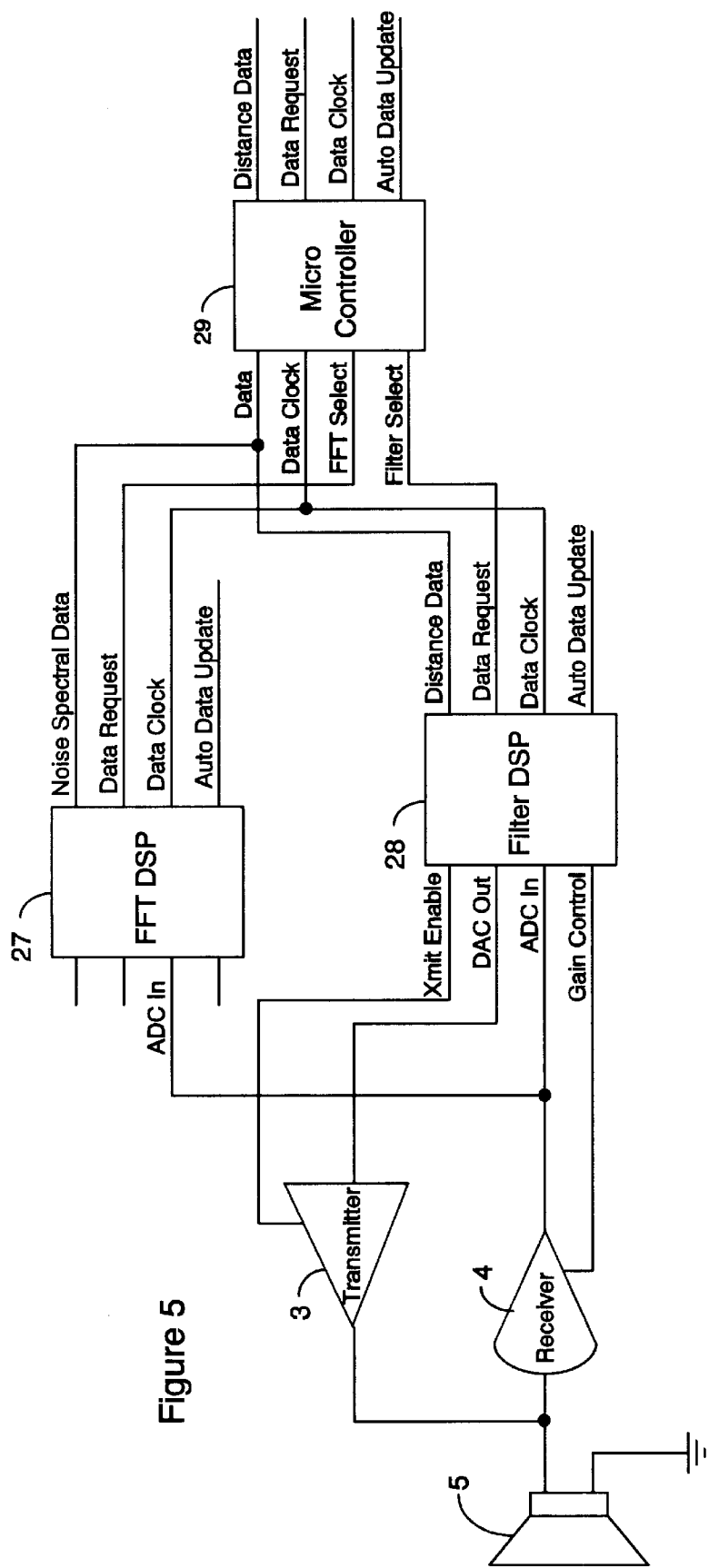
FIG. 5 is a diagram of a complex real-time alternative preferred embodiment of the sonar system.

FIG. 5 illustrates a more complex embodiment to that shown in FIG. 4, above. In this embodiment, the tasks performed by DSP 2 are preferably divided and distributed among a micro controller 29, an FFT DSP 27, and a Filter DSP 28 in order to meet a certain real time performance. The three chips, in turn, may be embedded together by chip manufacture in a single chip package for convenience. Depicted also, is a serial communication means between 27, 28, and 29. Here the FFT DSP 27 is used to monitor the environment and to provide the Micro Controller 29 with sonar frequencies that meet a certain condition, as demanded. The Filter DSP 28 is used to extract the echoes and pass them to the Micro Controller 29 as requested. Moreover, the Filter DSP 28 could set and transmit any frequency requested by the Micro Controller 29. The Micro Controller 29 could process the echo data from Filter DSP 28 further as requested from external devices, and, so on.

Figure 6:
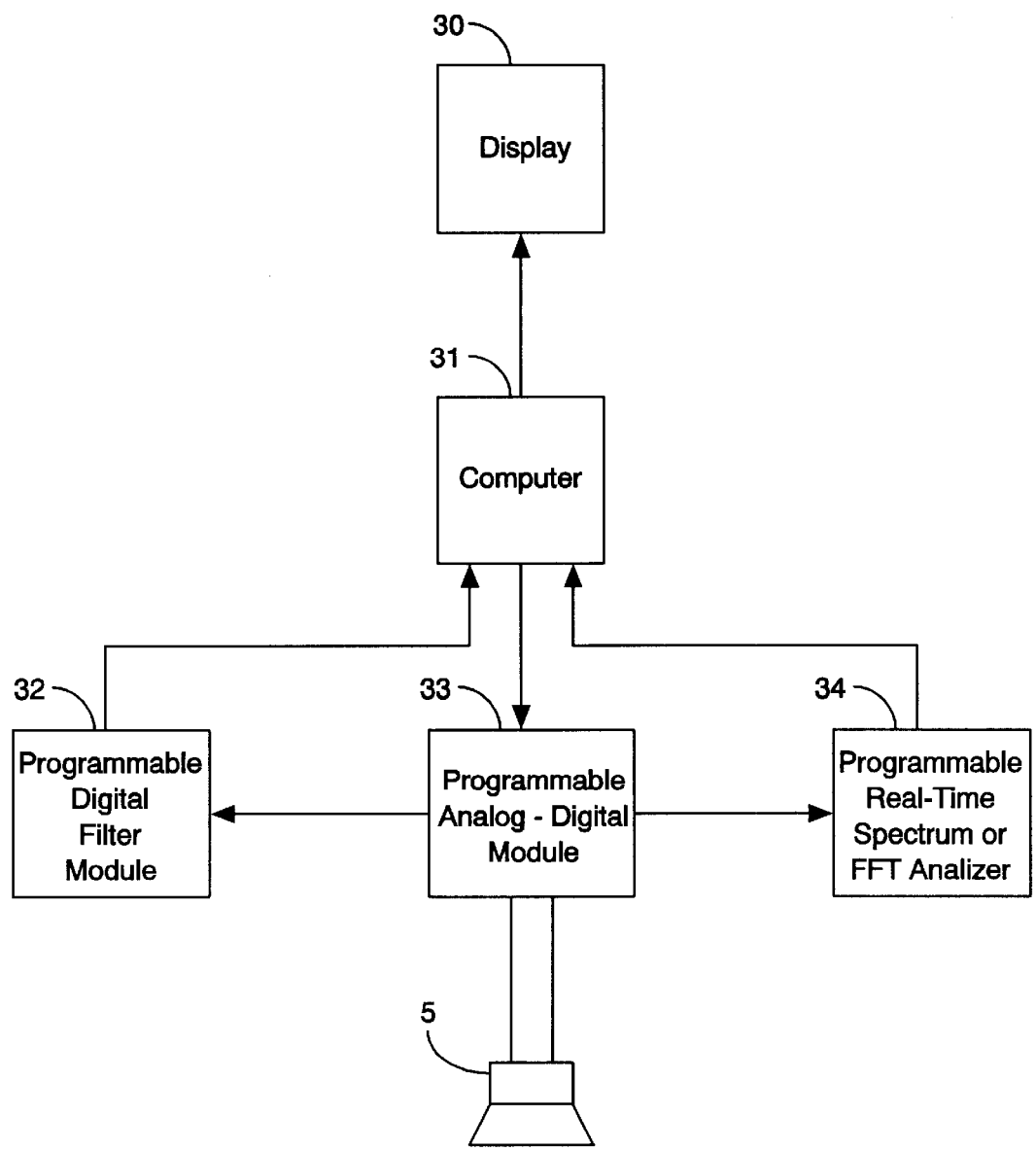
FIG. 6 is a diagram of another alternative embodiment in which the sonar system is controlled by an external computer.

In FIG. 6, another alternative embodiment is shown. The advantage of this embodiment over those previously discussed is that less development time is required to get the system to work, even though, computer programming to drive the system must still be written. Modules may be purchased from instrument companies directly and integrated into the system for immediate use. Care, however, should be taken to ensure inter-module communication speed meets acceptable sonar design requirements. In this embodiment, a computer 31 and the user application program directly control the operation of the sonar system. The computer 31 can be any suitable computer type. For example, the IBM PC, the Apple MAC, HP2000, etc. The computer 31 controls a programmable Analog-Digital IO module 33 that is programmed to drive the sensor 5 and to also receive signals from sensor 5 over the operable sonar frequencies. This module may be implemented in any convenient form: from computer internal expansion card to an external rack-mountable chassis, etc. The incoming signals are converted to digital data, and passed to a programmable digital filter module 32 where the echo signals whose frequency is the same as the transmitted frequency are extracted and processed by the user application in the computer 31.

The programmable Analog-Digital IO module 33 also provides the incoming analog signals to a programmable spectrum or FFT spectrum analyzer module 34 which generates and manages a digital noise spectral data that describes relative noise levels across the operable frequency band (refer to FIG. 2 for additional reference). The user application program requests and gets a frequency with a certain condition for use as the sonar transmission frequency for subsequent sonar transmissions, hence forming a dynamic variable frequency sonar system. The output display 30 is also controlled by the user application program, which will format and display desired information derived from the extracted echoes processed previously by the programmable Digital Filter Module 32.

As can be seen, the invention provides a mechanism that dynamically modifies the frequency used by the sonar system to select the frequency that will yield the best possible signal to noise ratio in the noisy environment.

While the invention has been described with respect to a preferred embodiment thereof, it will be understood by those skilled in the art that various changes in detail may be made therein without departing from the spirit, scope, and teaching of the invention. For example, the DSP function may be implemented by any suitable device, the user application may vary, etc. Accordingly, the invention herein disclosed is to be limited only as specified in the following claims.

We claim:

1. A method of dynamically changing sonar transmission frequencies in response to changing ambient noise, including the steps of:

periodically measuring ambient noise levels in a plurality of frequencies and selecting a sonar transmission frequency with a low ambient noise level by:
measuring the level of ambient noise for a plurality of frequencies within a range of available sonar frequencies;
determining a preferred frequency from the measured plurality of frequencies in the range of available sonar frequencies which has an ambient background noise level that is lower than a predetermined threshold level, or lower than the other measured frequencies within the range of available sonar frequencies; and transmitting a sonar signal using the preferred frequency;

whereby the sonar transmission frequency is dynamically changed on a periodic basis in response to changes in the ambient noise environment.

2. A method, as in claim 1, including the additional step of modulating the sonar signal.

3. A method, as in claim 1, including the additional step of simultaneously using multiple sonar frequencies.

4. A method, as in claim 1, including the additional step of adjusting the sonar frequency according to ambient noise levels prior to each sonar transmission.

5. A method, as in claim 1, including the additional step of adjusting the sonar frequency according to ambient noise levels on a predetermined basis.

6. A method, as in claim 1, including the additional step of adjusting the sonar frequency according to ambient noise levels when the sonar system is first activated.

7. A method, as in claim 1, including the additional step of controlling the selection of the sonar transmission frequency from software or firmware embedded in the sonar system.

8. A method, as in claim 7, wherein the system is a medical ultrasound system.

9. A method, as in claim 7, wherein the sonar system is a marine sonar system.

10. A method, as in claim 7, wherein the user application is consumer/industrial sonar system.

11. A sonar system, comprising:

a sonar receiver and transmitter, or transceiver, for transmitting sonar signals and receiving sonar echoes over a range of operable sonar frequencies;

dynamic selection means frequency, further comprising:

means to periodically measure ambient noise levels for a plurality of frequencies within a range of available frequencies;

means to dynamically select, from the plurality of measured frequencies, a sonar transmission frequency within the range of available frequencies which has an ambient background noise level that is lower than a predetermined threshold level, or that is lower than the other measured frequencies within the range of available sonar frequencies; and means to change the sonar transmission frequency to the selected sonar frequency, whereby, the sonar transmission frequency is dynamically changed on a periodic basis in response to changes in ambient background noise to avoid frequencies with high noise levels.

12. A method, as in claim 11, wherein the sonar system uses one of the following modulated transmission types: AM, FM, PCM, or FSK.

13. A method, as in claim 11, wherein the sonar system uses multiple transmission frequencies.

14. A sonar system, as in claim 11, wherein the sonar frequency is adjusted according to ambient noise per sonar transmission cycle.

15. A sonar system, as in claim 11, wherein the sonar frequency is adjusted according to ambient noise on a predetermined basis.

16. A sonar system, as in claim 11, wherein the sonar frequency is adjusted according to ambient noise when the sonar system is first activated.

17. A sonar system, as in claim 11, wherein the noise is measured by a sensor, and antenna, or an electrical source.

18. A sonar system, as in claim 17, wherein the system is a medical ultrasound system.

19. A sonar system, as in claim 17, wherein the system is a marine sonar system.

20. A sonar system, as in claim 17, wherein the system is consumer/industrial ultrasound or sonar system.

* * * * *